US009253443B1

(12) United States Patent
Chougle et al.

(10) Patent No.: US 9,253,443 B1
(45) Date of Patent: Feb. 2, 2016

(54) FILTERING VIDEO FOR VIDEO TELEPHONY AND VIDEO CONFERENCING

(71) Applicant: International Business Machines Corporation, Armonk, NY (US)

(72) Inventors: Abdullah Q. Chougle, Pune (IN); Akash U. Dhoot, Pune (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/636,859

(22) Filed: Mar. 3, 2015

(51) Int. Cl.
*H04N 7/15* (2006.01)
*H04N 5/14* (2006.01)
*G10L 15/00* (2013.01)

(52) U.S. Cl.
CPC *H04N 7/15* (2013.01); *G10L 15/00* (2013.01); *H04N 5/144* (2013.01)

(58) Field of Classification Search
CPC .......................................................... H04N 7/14
USPC ............. 348/14.16, 14.01, 14.1, 14.03, 14.07
See application file for complete search history.

(56) References Cited

U.S. PATENT DOCUMENTS

| 7,554,571 B1 | 6/2009 | Beck et al. |
| 7,720,283 B2 | 5/2010 | Sun et al. |
| 8,036,420 B2 | 10/2011 | Evans et al. |
| 8,161,113 B2 | 4/2012 | Gaurav et al. |
| 8,253,770 B2 | 8/2012 | Kurtz et al. |
| 8,305,448 B2 | 11/2012 | Yoda |
| 2006/0026626 A1 | 2/2006 | Malamud et al. |
| 2010/0124363 A1 | 5/2010 | Ek et al. |
| 2012/0051631 A1 | 3/2012 | Nguyen et al. |
| 2013/0083153 A1 | 4/2013 | Lindbergh |
| 2014/0028785 A1 | 1/2014 | Valentine et al. |

OTHER PUBLICATIONS

Elsbree, "Using Kinect Background Removal with Multiple Users", Kinect for Windows Blog, Oct. 22, 2013, <http://blogs.msdn.com/b/kinectforwindows/archive/2013/10/22/using-kinect-background-removal-with-multiple-users.aspx>.
"Image Stabilization", Wikipedia, the free encyclopedia, page last modified on Dec. 30, 2014, <http://en.wikipedia.org/wiki/Image_stabilization>.
"Web API's", © AMTERA Semantic Technologies, Jan. 6, 2015, <http://www.amtera.com.br/EN/webapi.html>.

*Primary Examiner* — Olisa Anwah
(74) *Attorney, Agent, or Firm* — Maeve McCarthy (57) ABSTRACT

In an approach to video filtering, a computer receives a first video frame of a presenter from a video feed that includes an audio feed. The computer extracts a face of the presenter and a background from the first video frame. The computer receives a second video frame. The computer determines whether a difference between the first video frame and the second video frame exceeds a pre-defined threshold. The computer converts the audio feed from speech to text. The computer determines whether the difference between the first video frame and the second video frame is expected, based, at least in part, on the converted audio feeds. The computer discards video data associated with the difference between the first video frame and the second video frame. The computer creates a third video frame, based, at least in part, on non-discarded video data.

20 Claims, 4 Drawing Sheets

FILTERING VIDEO FOR VIDEO TELEPHONY AND VIDEO CONFERENCING

BACKGROUND OF THE INVENTION

The present invention relates generally to the field of communication systems, and more particularly to filtering video for video telephony and video conferencing.

The use of video conferencing or telephony, which allows remote parties to both see and hear one another, is becoming increasingly popular. Video conferencing is the conduct of a video conference among a plurality of participants at two or more locations via one or more communication networks. A video conference provides simultaneous multi-way video and audio transmissions between the locations, thus enabling the participants to communicate with each other, both audibly and visually, in real time, even when the participants are remotely located with respect to one another. Accordingly, video conferencing allows parties to communicate without requiring lengthy and expensive travel. In this regard, a video conference is a specific form of video telephony.

Modern communication devices are growing increasingly complex. Devices such as cell phones and laptop computers now often are equipped with cameras, microphones, and other sensors. Depending on the context of a communication (e.g. where the person using the device is located and to whom they are communicating, the date and time of day, among possible factors), it may not always be advantageous to communicate information collected by the device in its entirety, and/or unaltered.

SUMMARY

Embodiments of the present invention disclose a method, a computer program product, and a system for video filtering. The method may include a computer receiving a first video frame of a presenter from a video feed that includes an audio feed. The computer extracts a face of the presenter and a background from the first video frame. The computer receives a second video frame. The computer determines whether a difference between the first video frame and the second video frame exceeds a pre-defined threshold. Responsive to determining the difference between the first video frame and the second video frame exceeds the pre-defined threshold, the computer converts the audio feed from speech to text. The computer determines whether the difference between the first video frame and the second video frame is expected, based, at least in part, on the converted audio feeds. Responsive to determining the difference between the first video frame and the second video frame is not expected, the computer discards video data associated with the difference between the first video frame and the second video frame. The computer creates a third video frame, based, at least in part, on non-discarded video data.

DETAILED DESCRIPTION

During a video conference, unwanted or unexpected disturbances in the background of a speaker may become distracting to a viewer. For example, a person walking behind the speaker or standing over the speaker's shoulder may interrupt a presentation. In some scenarios, the speaker may take precautions such as closing the door to the office or conference room, or warning others to not appear behind the speaker. In other scenarios, such as when the speaker is sitting in a cubicle or open office area, such precautions may not be possible. Using current technology, a speaker may have the capability to filter a background image, but there may be a circumstance when the speaker requests another person in the room to join the video conference, and the speaker does not want the new person filtered out of the video. Embodiments of the present invention recognize that video filtering may be improved by integrating speech recognition techniques to determine whether a disturbance is or is not expected. Implementation of embodiments of the invention may take a variety of forms, and exemplary implementation details are discussed subsequently with reference to the Figures.

Figure 1:
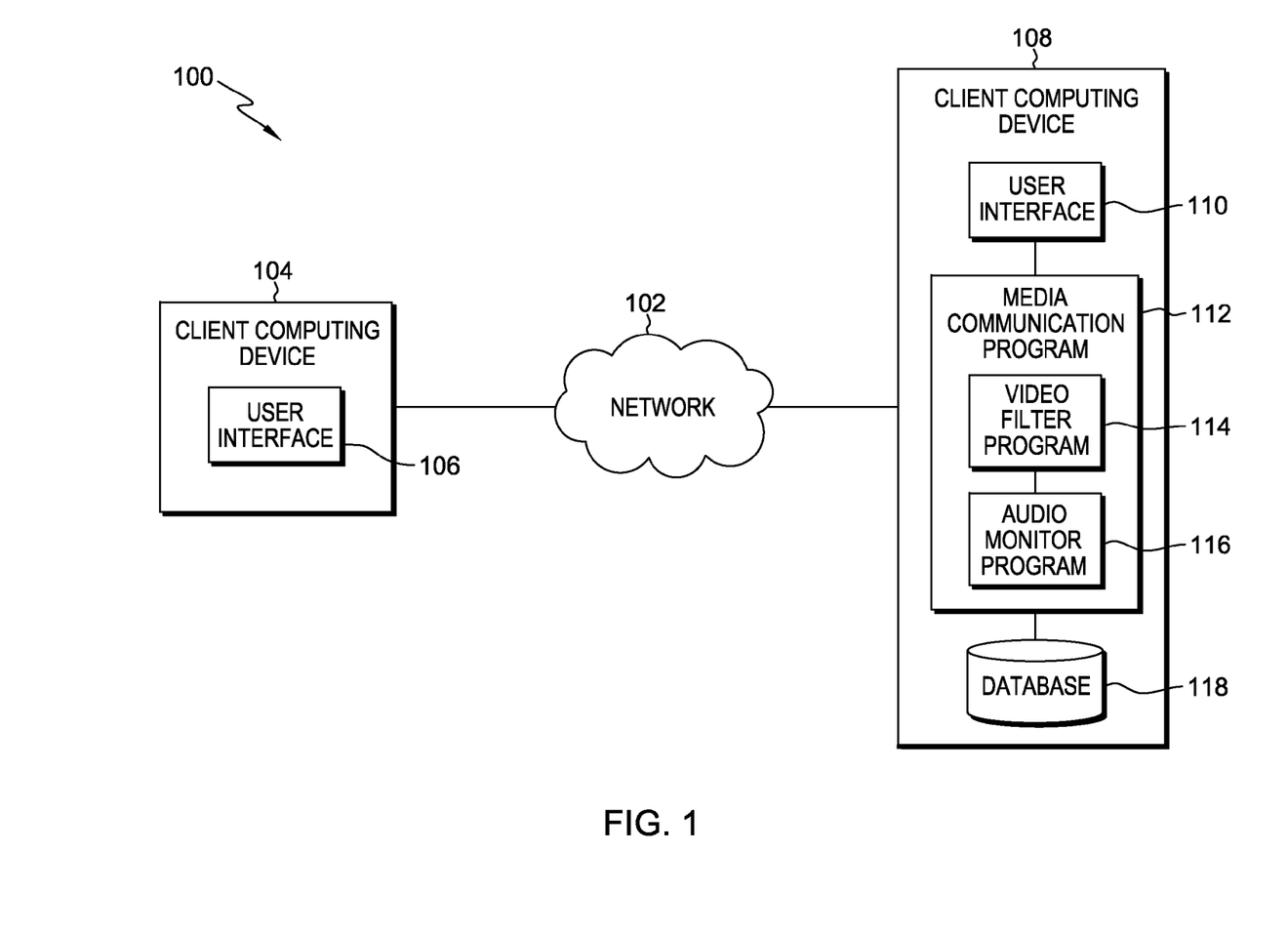
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and client computing device 108, both interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, client computing device 108, and other computing devices (not shown) within distributed data processing environment 100.

Client computing device 104 and client computing device 108 can each be a desktop computer, a laptop computer, a tablet computer, a specialized computer server, a smart phone, or any programmable electronic device capable of communicating with various components and devices within distributed data processing environment 100, via network 102. In general, client computing device 104 and client computing device 108 each represent any programmable electronic device or combination of programmable electronic devices capable of executing machine readable program instructions and communicating with other computing devices (not shown) within distributed data processing environment 100 via a network, such as network 102. Client computing device 104 includes user interface 106. Client computing device 108 includes user interface 110, media communication program 112, and database 118.

User interface 106 provides an interface between a user of client computing device 104 and client computing device 108. User interface 110 provides an interface between a user of client computing device 108 and client computing device 104. User interface 106 and user interface 110 may each be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 106 and user interface 110 may also each be mobile application software that provides an interface between a user of client computing device 104 and client computing device 108. Mobile application software, or an "app," is a computer program designed to run on smart phones, tablet computers and other mobile devices. User interface 106 enables a user of client computing device 104 to determine whether a user of client computing device 108 is filtering video during a conference. User interface 106 may also be the user interface to media communication program 112. User interface 110 enables a user of client computing device 108 to turn video filtering on and off during a conference. User interface 110 may also be the user interface to media communication program 112.

Media communication program 112 is one of a plurality of programs known in the art for video and audio communication. For example, media communication program 112 may be a program for video telephony, through which two or more users see and hear each other on a video conference call. In another example, media communication program 112 may be a web-based conference call system that enables users to call a central number to be simultaneously connected and view speakers and/or presentations. Media communication program 112 includes video filter program 114 and audio monitor program 116.

Video filter program 114 determines whether a delta, i.e., a disturbance, detected in an outgoing video stream is unwanted or unexpected, and, if so, filters the delta from the video stream. In the depicted embodiment, video filter program 114 is integrated into media communication program 112. In another embodiment, video filter program 114 is a standalone program. Video filter program 114 receives a first key frame of a video stream. Video filter program 114 extracts a face and background from the key frame. Video filter program 114 receives a new video frame as a delta to the key frame. Video filter program 114 determines whether the delta, or difference, between the new frame and the key frame exceeds a pre-defined threshold. If video filter program 114 determines that the delta exceeds the pre-defined threshold, then video filter program 114 determines whether the delta was due to movement of the speaker or due to the presence of an unexpected object, where an object can be a person or face or an actual object. If the delta was due to an unexpected object, then video filter program 114 creates a new video frame in which video filter program 114 discards the unexpected object. Video filter program 114 saves and transmits the new video frame. Video filter program 114 is depicted and described in further detail with respect to FIG. 2.

Audio monitor program 116 monitors audio feed when video filter program 114 is turned off by default, and suggests to a user to initiate video filtering when an introductory phrase is detected. Audio monitor program 116 monitors audio feed from a video stream and converts the speech to text. Audio monitor program 116 compares the text resulting from the detected speech to a retrieved filter list to determine whether any of the detected phrases or names are significantly similar to phrases or names on the filter list. If any of the detected phrases or names exceed the similarity threshold, then audio monitor program 116 suggests to the user to turn on video filtering. If the user agrees, then audio monitor program 116 initiates a video filter program. Audio monitor program 116 is depicted and described in further detail with respect to FIG. 3.

Database 118 resides on client computing device 108. In another embodiment, database 118 can reside on client computing device 104 or elsewhere in the environment. A database is an organized collection of data. Database 118 can be implemented with any type of storage device capable of storing data and configuration files that can be accessed and utilized by client computing device 108, such as a database server, a hard disk drive, or a flash memory. In other embodiments, database 118 can represent multiple storage devices within client computing device 108. Database 118 stores a pre-defined list of acceptable disturbances, introductory phrases, and names recognized by video filter program 114. Database 118 may also store a pre-defined threshold for measuring similarity between video frames. In addition, database 118 may store a pre-defined threshold of semantic relatedness for analyzing audio feed.

Figure 2:
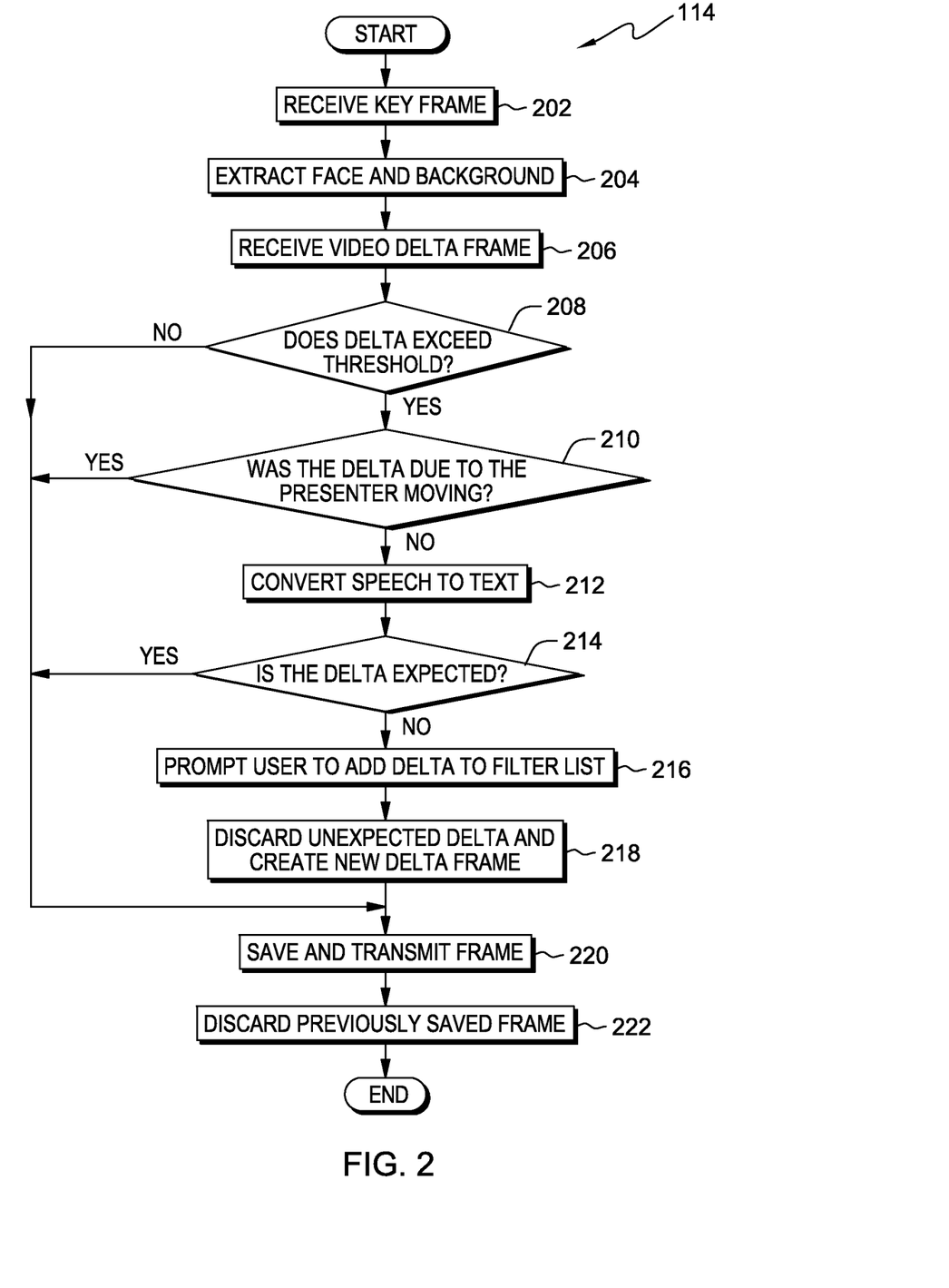
FIG. 2 is a flowchart depicting operational steps of a video filter program, on a client computing device within the distributed data processing environment of FIG. 1, for filtering unwanted disturbances, in accordance with an embodiment of the present invention.

FIG. 2 is a flowchart depicting operational steps of video filter program 114, on client computing device 108 within distributed data processing environment 100 of FIG. 1, for filtering unwanted disturbances, in accordance with an embodiment of the present invention.

Video filter program 114 receives a key frame (step 202). A key frame is a point in a video that defines the starting or ending points of any smooth transition. Video filter program 114 receives the key frame at the beginning of a video conference when media communication program 112 begins sending video. The key frame includes the entire image of the conference call. After media communication program 112 sends the key frame, following frames include only deltas from the key frame, in order to conserve bandwidth.

Video filter program 114 extracts a face and a background (step 204). Video filter program 114 extracts the face of the user, i.e., the presenter, and the background from the key frame. Video filter program 114 uses one of a plurality of face detection techniques known in the art to extract the face. Face detection is a computer technology that determines the locations and sizes of human faces in digital images. The technology detects one or more faces and ignores anything else, such as buildings, trees and bodies. Video filter program 114 separates the face from the background in the frame in order to be able to compare face images and background images in subsequent frames.

Video filter program 114 receives a video delta frame (step 206). When media communication program 112 sends a video delta frame that follows the key frame, video filter program 114 receives the video delta frame.

Video filter program 114 determines whether the received video delta frame exceeds a threshold (decision block 208). Each time video filter program 114 receives a video delta frame, video filter program 114 analyzes the video feed to determine the differences between the video delta frame and the previously received frame and compares the differences to a pre-defined threshold stored in database 118. For example, video filter program 114 may compare the location of the presenter's face in the frames and measure the distance moved to the left or right. In one embodiment, the pre-defined threshold is a default percentage of movement or change in the images of the two frames. If the differences in the video delta frame do not exceed the pre-defined threshold ("no" branch, decision block 208), then video filter program 114 saves and transmits the video delta frame (step 220).

If the differences in the video delta frame exceed the pre-defined threshold ("yes" branch, decision block 208), then video filter program 114 determines whether the delta was due to the presenter moving (decision block 210). For example, video filter program 114 may compare positions of the presenter's face, noting left to right or up and down movement to determine whether the position movement is within an expected threshold. Video filter program 114 analyzes the video delta frame to determine the source of the delta. The source of the delta may be from the presenter moving in the frame, or it may be from another disturbance, for example, the presence of a new object or person. If video filter program 114 determines the delta was due to the presenter moving ("yes" branch, decision block 210), then video filter program 114 saves and transmits the video delta frame (step 220).

If video filter program 114 determines the delta was not due to the presenter moving ("no" branch, decision block 210), then video filter program 114 converts speech to text (step 212). Video filter program 114 analyzes the audio feed by converting the speech to text using one of a plurality of speech recognition techniques known in the art. Once video filter program 114 converts the speech to text, video filter program 114 utilizes natural language processing (NLP) techniques to determine whether the presenter has spoken a phrase associated with introducing a person or object to the presentation. Natural language processing is a field of computer science, artificial intelligence, and linguistics concerned with the interactions between computers and human (natural) languages. As such, natural language processing is related to the area of human—computer interaction. A filter list, stored in database 118, lists pre-defined phrases that a speaker may use to introduce a new person or object to a video call or conference. For example, a phrase such as "let me allow <name> to discuss . . . " can be included in the filter list such that if video filter program 114 detects the presenter speaking the phrase, then video filter program 114 expects a new face to appear in the video feed. In another example, a phrase such as "let me demonstrate . . . " can be included in the filter list such that if video filter program 114 detects the presenter speaking the phrase, then video filter program 114 expects a new object to appear in the video feed.

Video filter program 114 determines whether the delta is expected (decision block 214). Video filter program 114 determines whether the disturbance that caused the video delta frame to exceed the delta threshold is expected by analyzing the audio feed, as discussed with respect to step 212. If video filter program 114 determines the delta is expected ("yes" branch, decision block 214), then video filter program 114 saves and transmits the video delta frame (step 220).

If video filter program 114 determines the delta is not expected ("no" branch, decision block 214), then video filter program 114 prompts the user to add the delta to the filter list (step 216). Video filter program 114 asks the user if the user would like to add at least a portion of the unexpected delta to the filter list. For example, video filter program 114 may present a pop-up box to the user with "yes" and "no" checkboxes, and the question "Would you like to add a new phrase to the filter list?" If a person has joined the presenter on a video conference that may regularly join the video conference in the future, the user can add the person's name to the filter list such that the next time the person joins a video conference, the delta is expected.

Video filter program 114 discards the unexpected delta and creates a new delta frame (step 218). Video filter program 114 filters the frame by discarding video data associated with the unexpected delta to the previous frame and preserving video data associated with any deltas that did not exceed the threshold. For example, if video filter program 114 detects a new face in the frame that was not expected, video filter program 114 discards the new face and includes any deltas to the presenter's face, such as a change in facial expression, in the frame.

Video filter program 114 saves and transmits the frame (step 220). Once video filter program 114 determines that a frame is acceptable, because the delta did not exceed the threshold, or because the delta was either due to movement of the presenter or an expected disturbance, or because video filter program 114 filtered out an unexpected delta, video filter program 114 saves and transmits the frame to the user of client computing device 104, i.e., the listener or viewer, via media communication program 112.

Video filter program 114 discards the previously saved frame (step 222). Although only shown once in FIG. 2, the process of receiving a video delta frame and determining whether filtering is required continues repeatedly until the video feed is complete. If video filter program 114 previously saved a frame prior to the frame saved in step 220, then video filter program 114 discards the previously saved frame such that video filter program 114 saves only one frame at a time.

In one embodiment, video filter program 114 is on by default, and begins processing video feed as soon as the video feed begins. In another embodiment, video filter program 114 can be turned on and off as needed, depending on user preference. Face detection and speech recognition techniques use additional system overhead and bandwidth, and depending on circumstances, a user may not want to use system resources for video filtering. For example, if a user is having a casual meeting with a coworker, the user may determine that video filtering is not necessary.

In a further embodiment, video filter program 114 sends an alert to participants in the video conference, via user interface 106, that video filter program 114 is running on the presenter's client computing device, such as client computing device 108. For example, video filter program 114 may display a privacy icon to participants in the video conference. In another example, video filter program 114 may display a pop-up box with text that indicates video filter program 114 is running.

Figure 3:
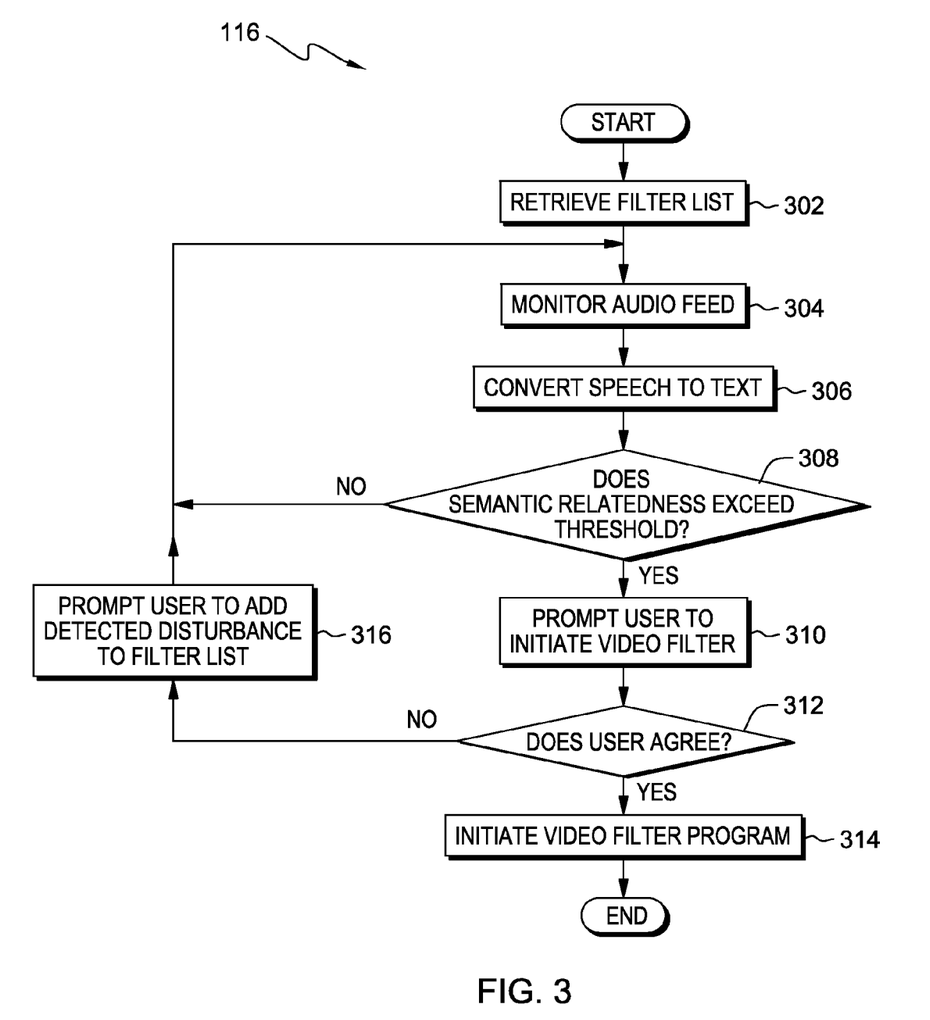
FIG. 3 is a flowchart depicting operational steps of an audio monitor program, on the client computing device within the distributed data processing environment of FIG. 1, for monitoring audio feed, in accordance with an embodiment of the present invention.

FIG. 3 is a flowchart depicting operational steps of audio monitor program 116, on client computing device 108 within distributed data processing environment 100 of FIG. 1, for monitoring audio feed, in accordance with an embodiment of the present invention.

Audio monitor program 116 retrieves the filter list (step 302). As discussed with respect to FIG. 2, a pre-defined filter list contains words and phrases that may be used by a presenter to introduce a new person or object into a frame. In one embodiment, the filter list includes phrases associated with introducing an eminent personality, such as a supervisor or customer. For example, a phrase such as "I would like to invite <person's name and title> from <company> to begin the talk" may be stored in the filter list in database 118. In another embodiment, the filter list includes acceptable disturbances such as sounds. For example, if the demonstration of a product includes the product making a sound, such as a bell ringing or a buzzer, the filter list can include the sounds. In a further embodiment, a user may input to the filter list prior to a video conference. For example, a user may add names, phrases, or sounds to the filter list in preparation for an expected disturbance.

Audio monitor program 116 monitors audio feed (step 304). By default, the video filter process, i.e., video filter program 114, is turned off, therefore audio monitor program 116 monitors the audio feed of a video conference.

Audio monitor program 116 converts speech to text (step 306). As discussed with respect to step 212 of FIG. 2, audio monitor program 116 analyzes the audio feed by converting the speech to text using one of a plurality of speech recognition techniques known in the art. Once audio monitor program 116 converts the speech to text, audio monitor program 116 utilizes NLP techniques to analyze the converted audio feed and determine whether the presenter has spoken a phrase associated with introducing a person or object to the presentation. Audio monitor program 116 integrates one of a plurality of explicit semantic analysis techniques known in the art with the NLP to check for semantic relatedness between phrases detected in the audio feed and the phrases in the filter list. Explicit semantic analysis is a representation of text (individual words or entire documents) that uses a document corpus, such as the filter list, as a knowledge base.

Audio monitor program 116 determines whether the semantic relatedness exceeds a threshold (decision block 308). A pre-defined threshold for semantic relatedness is stored in database 118. Audio monitor program 116 compares the converted audio feed to the filter list to determine the level of semantic relatedness. If the semantic relatedness does not exceed the threshold ("no" branch, decision block 308), then audio monitor program 116 continues to monitor the audio feed by returning to step 304.

If audio monitor program 116 determines that the semantic relatedness does exceed the threshold ("yes" branch, decision block 308), then audio monitor program 116 prompts the user to initiate the video filter (step 310). Audio monitor program 116 prompts the user, via user interface 110, to opt to turn on video filtering such that unwanted disturbances, such as background images, are removed from the video frame. For example, audio monitor program 116 may present a pop-up box to the user with "yes" and "no" checkboxes, and the question "Would you like to initiate video filtering?"

Audio monitor program 116 determines whether the user agrees (decision block 312). If audio monitor program 116 determines that the user does agree ("yes" branch, decision block 312), then audio monitor program 116 initiates a video filter program (step 314). At the user's request, audio monitor program 116 initiates a video filter program, such as video filter program 114, as previously described with respect to FIG. 2.

If the user indicates, via user interface 110, that video filtering is not necessary, and audio monitor program 116 determines the user does not agree ("no" branch, decision block 312), then audio monitor program 116 prompts the user to add the detected disturbance to the filter list (step 316). Audio monitor program 116 enables the user, via user interface 110, to opt to add the detected disturbance to the filter list such that the next time audio monitor program 116 detects the particular disturbance, the semantic relatedness will not exceed the threshold. For example, audio monitor program 116 may present a pop-up box to the user with "yes" and "no" checkboxes, and the question "Would you like to add a phrase to the filter list?"

Responsive to prompting the user to add the disturbance to the filter list, audio monitor program 116 continues to monitor the audio feed by returning to step 304. Audio monitor program 116 ends when the audio feed for the video conference is complete.

Figure 4:
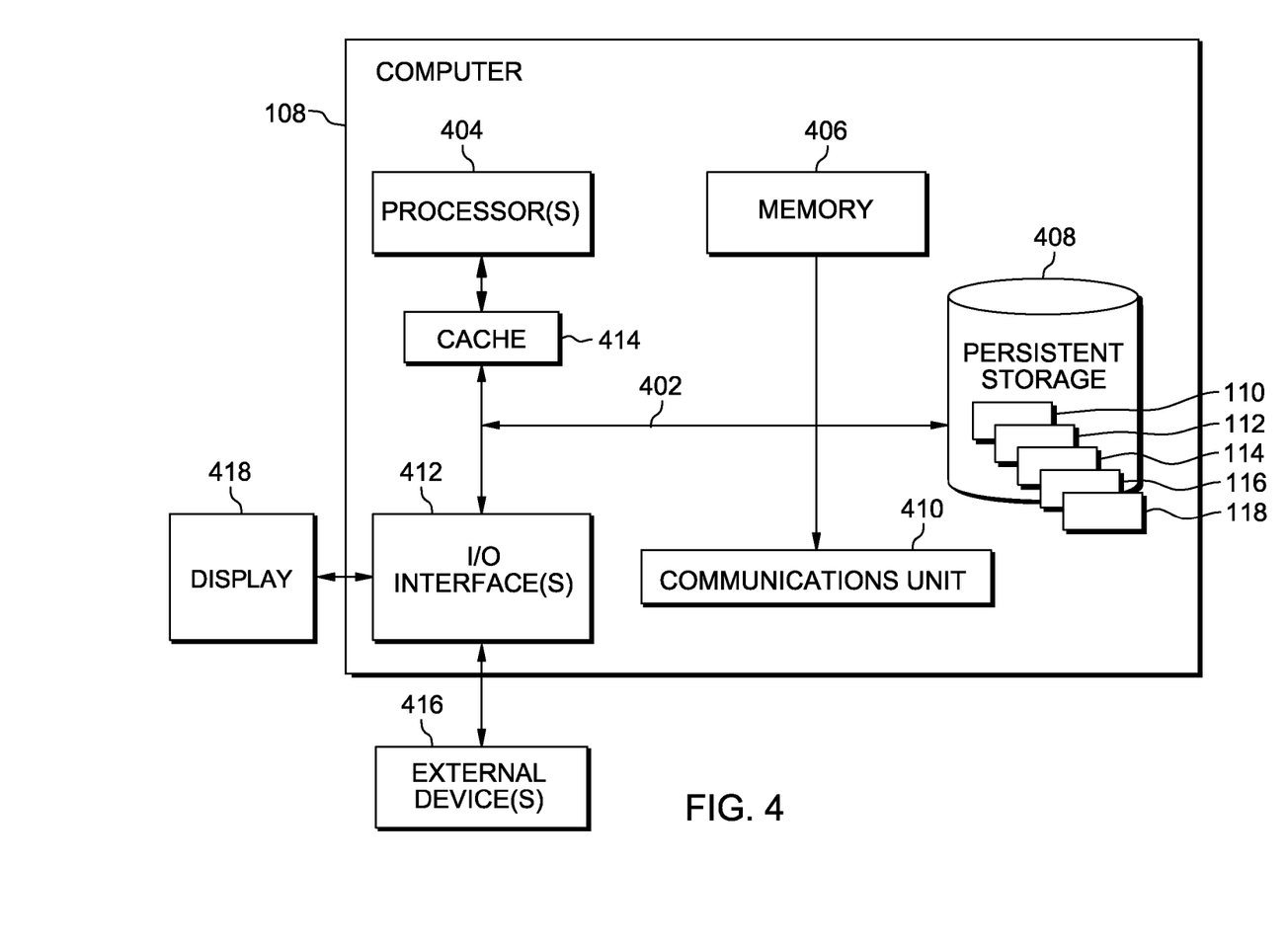
FIG. 4 depicts a block diagram of components of the client computing device executing the video filter program and the audio monitor program within the distributed data processing environment of FIG. 1, in accordance with an embodiment of the present invention.

FIG. 4 depicts a block diagram of components of client computing device 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Client computing device 108 includes processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., user interface 110, media communication program 112, video filter program 114, audio monitor program 116, and database 118 are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104. In these examples, communications unit 410 includes one or more network interface cards. Communications unit 410 may provide communications through the use of either or both physical and wireless communications links. User interface 110, media communication program 112, video filter program 114, audio monitor program 116, and database 118 may be downloaded to persistent storage 408 through communications unit 410.

I/O interface(s) 412 allows for input and output of data with other devices that may be connected to client computing device 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media, for example, devices such as thumb drives, portable optical or magnetic disks, and memory cards. Software and data used to practice embodiments of the present invention, e.g., user interface 110, media communication program 112, video filter program 114, audio monitor program 116, and database 118, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for video filtering, the method comprising:
   receiving, by one or more computer processors, a first video frame of a presenter from a video feed that includes an audio feed;
   extracting, by the one or more computer processors, a face of the presenter and a background from the first video frame;
   receiving, by the one or more computer processors, a second video frame;
   determining, by the one or more computer processors, whether a difference between the first video frame and the second video frame exceeds a pre-defined threshold;
   responsive to determining the difference between the first video frame and the second video frame exceeds the pre-defined threshold, converting, by the one or more computer processors, the audio feed from speech to text;
   determining, by the one or more computer processors, whether the difference between the first video frame and the second video frame is expected, based, at least in part, on the converted audio feed;
   responsive to determining the difference between the first video frame and the second video frame is not expected, discarding, by the one or more computer processors, video data associated with the difference between the first video frame and the second video frame; and
   creating, by the one or more computer processors, a third video frame, based, at least in part, on non-discarded video data.

2. The method of claim 1, further comprising:
   responsive to creating a third video frame, saving, by the one or more computer processors, the third video frame;
   transmitting, by the one or more computer processors, the third video frame; and
   discarding, by the one or more computer processors, the first video frame.

3. The method of claim 1, further comprising, responsive to determining the difference between the first video frame and the second video frame exceeds a pre-defined threshold, determining, by the one or more computer processors, whether the difference between the first video frame and the second video frame is due to movement of the presenter.

4. The method of claim 1, wherein determining whether the difference between the first video frame and the second video frame is expected further comprises:
   comparing, by the one or more computer processors, the converted audio feed to a pre-defined list of one or more acceptable disturbances; and
   determining, by the one or more computer processors, whether at least a portion of the converted audio feed is included in the pre-defined list.

5. The method of claim 4, further comprising:
   responsive to determining at least the portion of the converted audio feed is not included in the pre-defined list, determining, by the one or more computer processors, whether the presenter opts to add at least the portion of the converted audio feed to the pre-defined list; and
   responsive to determining the presenter opts to add at least the portion of the converted audio feed to the pre-defined list, adding, by the one or more computer processors, at least the portion of the converted audio feed to the pre-defined list.

6. The method of claim 4, wherein the pre-defined list includes at least one or more acceptable disturbances, one or more introductory phrases, one or more acceptable phrases, and one or more names.

7. The method of claim 1, further comprising:
   prior to the steps of claim 1:
      retrieving, by the one or more computer processors, a pre-defined list of one or more acceptable phrases;
      converting, by the one or more computer processors, the audio feed from speech to text;
      determining, by the one or more computer processors, whether a semantic relatedness of the converted audio feed to the pre-defined list exceeds a pre-defined threshold;
      responsive to determining the semantic relatedness of the converted audio feed to the pre-defined list exceeds a pre-defined threshold, determining, by the one or more computer processors, whether the presenter opts to initiate video filtering; and
      responsive to determining the presenter opts to initiate video filtering, initiating, by the one or more computer processors, video filtering.

8. The method of claim 7, further comprising, responsive to determining the presenter does not opt to initiate video filtering, determining, by the one or more computer processors, whether the presenter opts to add one or more phrases to the pre-defined list.

9. A computer program product for video filtering, the computer program product comprising:
   one or more computer readable storage device and program instructions stored on the one or more computer readable storage device, the program instructions comprising:
   program instructions to receive a first video frame of a presenter from a video feed that includes an audio feed;
   program instructions to extract a face of the presenter and a background from the first video frame;
   program instructions to receive a second video frame;
   program instructions to determine whether a difference between the first video frame and the second video frame exceeds a pre-defined threshold;
   responsive to determining the difference between the first video frame and the second video frame exceeds the pre-defined threshold, program instructions to convert the audio feed from speech to text;

program instructions to determine whether the difference between the first video frame and the second video frame is expected, based, at least in part, on the converted audio feed;

responsive to determining the difference between the first video frame and the second video frame is not expected, program instructions to discard video data associated with the difference between the first video frame and the second video frame; and program instructions to create a third video frame, based, at least in part, on non-discarded video data.

10. The computer program product of claim 9, further comprising:

responsive to creating a third video frame, program instructions to save the third video frame;

program instructions to transmit the third video frame; and program instructions to discard the first video frame.

11. The computer program product of claim 9, further comprising, responsive to determining the difference between the first video frame and the second video frame exceeds a pre-defined threshold, program instructions to determine whether the difference between the first video frame and the second video frame is due to movement of the presenter.

12. The computer program product of claim 9, wherein program instructions to determine whether the difference between the first video frame and the second video frame is expected further comprise:

program instructions to compare the converted audio feed to a pre-defined list of one or more acceptable disturbances; and program instructions to determine whether at least a portion of the converted audio feed is included in the pre-defined list.

13. The computer program product of claim 12, wherein the pre-defined list includes at least one or more acceptable disturbances, one or more introductory phrases, one or more acceptable phrases, and one or more names.

14. The computer program product of claim 9, further comprising:

prior to the steps of claim 9:

program instructions to retrieve a pre-defined list of one or more acceptable phrases;

program instructions to convert the audio feed from speech to text;

program instructions to determine whether a semantic relatedness of the converted audio feed to the pre-defined list exceeds a pre-defined threshold;

responsive to determining the semantic relatedness of the converted audio feed to the pre-defined list exceeds a pre-defined threshold, program instructions to determine whether the presenter opts to initiate video filtering; and responsive to determining the presenter opts to initiate video filtering, program instructions to initiate video filtering.

15. A computer system for video filtering, the computer system comprising:

one or more computer processors;

one or more computer readable storage device;

program instructions stored on the one or more computer readable storage device for execution by at least one of the one or more computer processors, the program instructions comprising:

program instructions to receive a first video frame of a presenter from a video feed that includes an audio feed;

program instructions to extract a face of the presenter and a background from the first video frame;

program instructions to receive a second video frame;

program instructions to determine whether a difference between the first video frame and the second video frame exceeds a pre-defined threshold;

responsive to determining the difference between the first video frame and the second video frame exceeds the pre-defined threshold, program instructions to convert the audio feed from speech to text;

program instructions to determine whether the difference between the first video frame and the second video frame is expected, based, at least in part, on the converted audio feed;

responsive to determining the difference between the first video frame and the second video frame is not expected, program instructions to discard video data associated with the difference between the first video frame and the second video frame; and program instructions to create a third video frame, based, at least in part, on non-discarded video data.

16. The computer system of claim 15, further comprising:

responsive to creating a third video frame, program instructions to save the third video frame;

program instructions to transmit the third video frame; and program instructions to discard the first video frame.

17. The computer system of claim 15, further comprising, responsive to determining the difference between the first video frame and the second video frame exceeds a pre-defined threshold, program instructions to determine whether the difference between the first video frame and the second video frame is due to movement of the presenter.

18. The computer system of claim 15, wherein program instructions to determine whether the difference between the first video frame and the second video frame is expected further comprise:

program instructions to compare the converted audio feed to a pre-defined list of one or more acceptable disturbances; and program instructions to determine whether at least a portion of the converted audio feed is included in the pre-defined list.

19. The computer system of claim 18, wherein the pre-defined list includes at least one or more acceptable disturbances, one or more introductory phrases, one or more acceptable phrases, and one or more names.

20. The computer system of claim 15, further comprising:

prior to the steps of claim 15:

program instructions to retrieve a pre-defined list of one or more acceptable phrases;

program instructions to convert the audio feed from speech to text;

program instructions to determine whether a semantic relatedness of the converted audio feed to the pre-defined list exceeds a pre-defined threshold;

responsive to determining the semantic relatedness of the converted audio feed to the pre-defined list exceeds a pre-defined threshold, program instructions to determine whether the presenter opts to initiate video filtering; and responsive to determining the presenter opts to initiate video filtering, program instructions to initiate video filtering.

* * * * *